United States Patent
Mukherjee et al.

(10) Patent No.: US 10,731,091 B2
(45) Date of Patent: Aug. 4, 2020

(54) MULTISTAGE RESID HYDROCRACKING

(71) Applicant: Lummus Technology Inc., Bloomfield, NJ (US)

(72) Inventors: Ujjal K. Mukherjee, Montclair, NJ (US); Marvin I. Greene, Clifton, NJ (US); Mario C. Baldassari, Morris Plains, NJ (US)

(73) Assignee: LUMMUS TECHNOLOGY LLC, Bloomfield, NJ (US)

( * ) Notice: Subject to any disclaimer, the term of this patent is extended or adjusted under 35 U.S.C. 154(b) by 0 days.

(21) Appl. No.: 15/850,893

(22) Filed: Dec. 21, 2017

(65) Prior Publication Data

US 2018/0179457 A1 Jun. 28, 2018

Related U.S. Application Data

(60) Provisional application No. 62/437,859, filed on Dec. 22, 2016.

(51) Int. Cl.
| | |
|---|---|
| *C10G 45/72* | (2006.01) |
| *C10G 69/02* | (2006.01) |
| *C10G 67/04* | (2006.01) |
| *C10G 21/00* | (2006.01) |
| *C10G 45/20* | (2006.01) |
| *B01D 3/14* | (2006.01) |
| *B01D 3/10* | (2006.01) |

(Continued)

(52) U.S. Cl.
CPC ............... *C10G 69/02* (2013.01); *B01D 1/28* (2013.01); *B01D 3/009* (2013.01); *B01D 3/10* (2013.01); *B01D 3/14* (2013.01); *B01D 3/143* (2013.01); *C10G 21/003* (2013.01); *C10G 45/20* (2013.01); *C10G 45/72* (2013.01); *C10G 67/049* (2013.01); *C10G 2300/107* (2013.01); *C10G 2300/1077* (2013.01); *C10G 2300/206* (2013.01); *C10G 2300/301* (2013.01); *C10G 2400/16* (2013.01)

(58) Field of Classification Search
CPC ..... C10G 65/12; C10G 65/14; C10G 67/0454
See application file for complete search history.

(56) References Cited

U.S. PATENT DOCUMENTS

| | | | | |
|---|---|---|---|---|
| 2,987,465 | A | * 6/1961 | Johanson | ............. C10G 49/12 |
| | | | | 208/408 |
| 4,062,758 | A | * 12/1977 | Goudriaan | ......... C10G 67/0454 |
| | | | | 208/108 |
| 4,239,616 | A | 12/1980 | Gearhart | |

(Continued)

FOREIGN PATENT DOCUMENTS

CN 201832624 U 5/2011

OTHER PUBLICATIONS

International Search Report and Written Opinon issued in corresponding International Application No. PCT/US2017/067921 dated Apr. 16, 2018 (17 pages).

*Primary Examiner* — Michelle Stein
(74) *Attorney, Agent, or Firm* — Osha Liang LLP (57) ABSTRACT

Processes and systems for upgrading resid hydrocarbon feeds are disclosed. The process system may operate in two different operating modes, maximum conversion and maximum quality effluent. The process system may be reversibly transitioned between the different operating modes. The system has the ability to reversibly transition between the two modes without shutting down the system or losing production.

15 Claims, 5 Drawing Sheets

(51) Int. Cl.
*B01D 1/28* (2006.01)
*B01D 3/00* (2006.01)

(56) References Cited

U.S. PATENT DOCUMENTS

| | | |
|---|---|---|
| 4,354,922 A | 10/1982 | Derbyshire et al. |
| 4,354,928 A | 10/1982 | Audeh et al. |
| 4,440,633 A | 4/1984 | Jacquin et al. |
| 4,536,283 A | 8/1985 | Davis |
| 5,980,730 A * | 11/1999 | Morel ................ C10G 69/04 208/100 |
| 6,017,441 A * | 1/2000 | Morel ............... C10G 67/0454 208/100 |
| 6,277,270 B1 | 8/2001 | Morel et al. |
| 6,436,279 B1 * | 8/2002 | Colyar ................ C10G 45/16 208/107 |
| 7,214,308 B2 | 5/2007 | Colyar |
| 8,002,967 B2 * | 8/2011 | Hunter ............... C10G 65/02 208/89 |
| 9,273,256 B2 | 3/2016 | Gillis et al. |
| 2010/0320122 A1 * | 12/2010 | Baldassari ........ C10G 21/003 208/96 |
| 2014/0034549 A1 | 2/2014 | Mukherjee et al. |

* cited by examiner

MULTISTAGE RESID HYDROCRACKING

BACKGROUND OF DISCLOSURE

Embodiments disclosed herein relate generally to processes for upgading petroleum feedstocks. In one aspect, embodiments disclosed herein relate to a process for hydrocracking and deasphalting resid. In another aspect, embodiments disclosed herein relate to an integrated process for upgrading resid and producing a feed to a residual fluid catalytic cracking (RFCC) unit including multiple hydrocracking stages.

Hydrocarbon compounds are useful for a number of purposes. In particular, hydrocarbon compounds are usefill, inter alia, as fuels, solvents, degreasers, cleaning agents, and polymer precursors. The most important source of hydrocarbon compounds is petroleum crude oil, Refining of crude oil into separate hydrocarbon compound fractions is a well-known processing technique.

Crude oils range widely in their composition and physical and chemical properties. Heavy crudes are characterized by a relatively high viscosity, low API gravity, and high percentage of high boiling components (i.e., having a normal boiling point typically ranging from about 260° C.(500° F.) to about 600° C.(1112° F.)).

Refined petroleum products generally have higher average hydrogen to carbon ratios on a molecular basis. Therefore, the upgrading of a petroleum refinery hydrocarbon fraction is generally classified into one of two categories: hydrogen addition and carbon rejection. Hydrogen addition is performed by processes such as hydrocracking and hydrotreating. Carbon rejection processes typically produce a stream of rejected high carbon material which may be a liquid or a solid; e.g., coke deposits.

Conventional approaches to upgrade higher boiling materials include converting vacuum residua may be done in numerous ways. In these conventional methods, crude oil is distilled in an atmospheric distillation tower to generate straight run distillates and an atmospheric resid (AR) which may be processed in an atmospheric resid desulfurization (ARDS) unit. The 370+° C. bottoms fraction may be upgraded in a resid fluid catalytic cracking (RFCC) unit to produce distillate fuel products.

In other conventional methods, crude oil may be distilled in an atmospheric distillation tower to generate straight run distillates and an atmospheric resid (AR) which may be further distilled in a vacuum distillation unit to produce vacuum gas oil (VGO) and vacuum resid (VR) streams. The VR may be fed to a vacuum resid desulfurization (VRDS) unit. A VRDS unit is a fixed bed hydrotreating unit where the catalyst requires changeout after a certain interval, typically between 9 and 12 months, The VGO may be fed to an FCC pre-treater to reduce sulfur and nitrogen. The FCC pre-treater effluent and the VRDS 370+° C. unit effluent may be combined and fed to an RFCC unit to produce distillate fuel, In still other conventional methods, crude oil may be distilled in an atmospheric distillation tower to generate straight run distillates and an atmospheric resid (AR) which may be further distilled in a vacuum distillation unit to produce vacuum gas oil (VGO) and vacuum resid (VR) streams. The VGO may he fed to an FCC pre-treater to reduce sulfur and nitrogen. The VR may he fed to a residue upgrading unit integrated with a fixed-bed hydrotreater/hydrocracker unit to produce distillate fuel products and a byproduct pitch stream, Conventional hydrocracking processes can be used to upgrade higher boiling materials, such as resid, typically present in heavy crude oil by converting them into more valuable lower boiling materials. For example, at least a portion of the resid feed to a hydrocracking reactor may be converted to a hydrocracking reaction product. The unreacted resid may be recovered from the hydrocracking process and either removed or recycled back to the hydrocracking reactor in order to increase the overall resid conversion.

The resid conversion in a hydrocracking reactor can depend on a variety of flictors, including feedstock composition; the type of reactor used; the reaction severity, including temperature and total pressure conditions; reactor space velocity; hydrogen partial pressure and catalyst type and performance. In particular, the reaction severity may be used to increase the conversion. However, as the reaction severity increases, side reactions may occur inside the hydrocracking reactor to produce various byproducts in the form of coke precursors, sediments, and other deposits as well as byproducts which may form a secondary liquid phase. Excessive formation of such sediments can hinder subsequent processing and can deactivate the hydrocracking catalyst by poisoning, coking, or fouling. Deactivation of the hydrocracking catalyst can not only significantly reduce the resid conversion, but also result in higher catalyst usage, requiring more frequent change-outs of expensive catalyst. Formation of a secondary liquid phase not only deactivates the hydrocracking catalyst, hut also leads to the defluidization of the catalyst bed, thereby limiting the maximum conversion. This leads to formation of "hot zones" within the catalyst bed, exacerbating the formation of coke, which further deactivates the hydrocracking catalyst.

Sediment formation inside the hydrocracking reactor is also a strong function of the feedstock quality. For example, asphaltenes that may be present in the resid feed to the hydrocracking reactor system are especially prone to forming sediments when subjected to severe operating conditions. Thus, separation of the asphaltenes from the resid in order to increase the conversion may be desirable.

One type of process that may be used to remove such asphaltenes from the heavy hydrocarbon residue feed is solvent deasphalting. For example, solvent deasphalting typically involves physically separating the lighter hydrocarbons and the heavier hydrocarbons including asphaltenes based on their relative affinities for the solvent. A light solvent such as a $C_3$ to $C_7$ hydrocarbons can be used to dissolve or suspend the lighter hydrocarbons, commonly referred to as deasphalted oil, allowing the asphaltenes to be precipitated. The two phases are then separated and the solvent is recovered.

Several methods for integrating solvent deasphalting with hydrocracking in order to remove asphaltenes from resid are available. In particular, contacting the residue feed in a solvent deasphalting system to separate the asphaltenes from deasphalted oil is known. The deasphalted oil and the asphaltenes are then each reacted in separate hydrocracking reactor systems.

Moderate overall resid conversions (about 65% to 70%) may be achieved using such processes, as both the deasphalted oil and the asphaltenes are separately hydrocracked. However, the hydrocracking of asphaltenes is at high severity/high conversion, and may present special challenges, as discussed above. For example, operating the asphaltenes hydrocracker at high severity in order to increase the conversion may also cause a high rate of sediment formation, and a high rate of catalyst replacement. In contrast, operating the asphaltenes hydrocracker at low severity will suppress sediment formation, but the per-pass conversion of asphaltenes will be low. In order to achieve a higher overall resid conversion, such processes typically require a high recycle rate of the unreacted resid back to one or more of the hydrocracking reactors. Such high-volume recycle can significantly increase the size of the hydrocracking reactor and/or the upstream solvent deasphalting system.

Petroleum refineries use a number of processing steps to produce the distillate fuel products of gasoline, jet, diesel and distillate fuel oils to meet market demands. In recent times, the product demands for gasoline vs diesel have undergone dramatic shifts and gasoline demand has been increasing relative to diesel demand. Conventional VR hydrocracking systems generally maximize middle distillate production, in particular, diesel. Thus there is a need for refiners who operate ebullated-bed resid hydrocrackers to have the flexibility to readily and economically switch from operating in the max conversion mode which maximizes diesel production to operating in a mode wherein higher quality, i.e., lower S and lower N contents, VGO or VR product is generated which is subsequently processed in a downstream RFCC unit to produce and maximize gasoline production and most importantly, to do so without having to shut down to change out catalysts and thereby suffering loss of product revenues during the shutdown.

Accordingly, there exists a need for improved flexibility resid hydrocracking processes that achieve a high resid conversion, reduces the total number of equipment, reduces the overall equipment size of hydrocracking reactor and/or solvent deasphalter, and require less frequent hydrocracking catalyst change-outs. What would be desired is a process that would take advantage of the ability of a residue hydrocracking process for high conversion and long sustained run lengths without catalyst changeout while achieving the higher quality effluent produced from a fixed bed residue hydrotreating unit, such as ARDS and VRDS. The process should also have the ability for reversible transition.

SUMMARY OF THE DISCLOSURE

In one aspect, embodiments disclosed herein relate to a process for upgrading resid. The process may include; feeding hydrogen and a resid hydrocarbon to a first ebullated bed reactor containing a first hydrocracking catalyst; contacting the resid and hydrogen in the presence of the hydrocracking catalyst at conditions of temperature and pressure to crack at least a portion of the resid; separating a product from the first reactor into a first gas phase and a first liquid phase product; feeding hydrogen and a deasphalted oil hydrocarbon fraction and a vacuum distillate hydrocarbon fraction to a second bed reactor containing a hydrotreating catalyst; contacting the deasphalted oil hydrocarbon fraction, the vacuum distillate hydrocarbon fraction and hydrogen in the presence of the hydrotreating catalyst at conditions of temperature and pressure to hydrotreat at least a portion of the deasphalted oil hydrocarbon fraction and the vacuum distillate hydrocarbon fraction; separating a product from the second reactor into a second gas phase and a second liquid phase product; separating the second liquid phase product into a second reactor effluent and a residual fluid catalytic cracking (RFCC) feed; fractionating the first liquid phase product and the second reactor effluent to form at least one distillate hydrocarbon fraction, the vacuum distillate hydrocarbon fraction, and at least one resid hydrocarbon fraction; and feeding the at least one resid hydrocarbon fraction to a solvent deasphalting unit to provide an asphaltene fraction and the deasphalted oil hydrocarbon fraction.

In another aspect, embodiments disclosed herein relate to a process for upgrading resid in a system that may include: a first ebullated bed reactor; a first separator; a stripping tower; a fractionation system; and a solvent deasphalting system. The process may include: operating the system in a first mode to produce a feed for a residual fluid catalytic cracking (RFCC) unit and operating the system in a second mode to maximize the resid conversion in the first ebullated bed reactor. In some embodiments, the first mode may include: reacting a deasphalted oil and a vacuum distillate in the first ebullated bed reactor containing a hydrotreating catalyst to form a first effluent; separating the first effluent in the first separator into a first gas phase and a first liquid phase; stripping the first liquid phase in the stripping tower to produce a strippers bottom and a stripper overhead; fractionating the stripper overhead in the fractionation system to produce at least one atmospheric distillate and an atmospheric bottoms; fractionating the atmospheric bottoms in the fractionation system to produce the vacuum distillate and a vacuum bottoms; solvent deasphalting the vacuum bottoms in the solvent deasphalting system to produce the deasphalted oil; and transporting the strippers bottoms as the feed to the RFCC unit. In some embodiments, the second mode may include: reacting the deasphalted oil in the first ebullated bed reactor containing a hydrocracking catalyst to form a second effluent; separating the second effluent in the first separator into a second gas phase and a second liquid phase; fractionating the second liquid phase in the fractionation system to produce at least one atmospheric distillate and an atmospheric bottoms; fractionating the atmospheric bottoms in the fractionation system to produce the vacuum distillate and the vacuum bottoms; and solvent deasphalting the vacuum bottoms to produce the deasphalted oil. In some embodiments, transitioning the system between the first mode and the second mode, may include: removing the hydrotreating catalyst from the first ebullated bed reactor while simultaneously adding a hydrocracking catalyst to the first ebullated bed reactor; and fractionating the first liquid phase in the fractionation system to produce the at least one atmospheric distillate and the atmospheric bottoms.

Other aspects and advantages will be apparent from the following description and the appended claims.

DETAILED DESCRIPTION

Embodiments disclosed herein relate generally to process for upgrading petroleum feedstocks, in one aspect, embodiments disclosed herein relate to a process for hydrocracking and deasphalting resid. In another aspect, embodiments disclosed herein relate to an integrated process for upgrading resid including multiple hydrocracking stages to maximize RFCC unit feed for gasoline production.

Residuum hydrocarbon (resid) feedstocks useful in embodiments disclosed herein may include various heavy crude and refinery fractions. For example, resid hydrocarbon feedstocks may include fresh resid hydrocarbon feeds, petroleum atmospheric or vacuum residue, hydrocracked atmospheric tower or vacuum tower bottoms, straight run vacuum gas oil, hydrocracked vacuum gas oil, fluid catalytically cracked (FCC) slurry oils or cycle oils, as well as other similar hydrocarbon streams, or a combination thereof, each of which may be straight run, process derived, hydrocracked, partially desulfurized, and/or low-metal streams. The above resid feedstocks may include various impurities, including asphaltenes, metals, organic sulfur, organic nitrogen, and Conradson carbon residue (CCR). The initial boiling point of the resid is typically greater than about 260° C. In some embodiments, residuum hydrocarbon fractions may include hydrocarbons having a normal boiling point of at least 480° C., at least 524° C., or at least 565° C. The final boiling point of the resid is may be about 340 C+; about 370 C+; about 400 C+; about 425 C+; about 450 C+; about 480 C+; about 510 C+; about 540 C+; about 565 C+; about 590 C+; or about 620 C+.

Processes according to embodiments disclosed herein for conversion of resid hydrocarbon feedstocks to lighter hydrocarbons include initially hydrocracking the resid feedstock, including any asphaltenes contained therein. The entire resid feed, including asphaltenes, may be reacted with hydrogen over a hydrocracking catalyst in a first hydrocracking reaction stage to convert at least a portion of the hydrocarbons to lighter molecules, including the conversion of at least a portion of the asphaltenes. In order to mitigate sediment formation, the first stage hydrocracking reaction may be conducted at temperatures and pressures that may avoid high rates of sediment formation and catalyst fouling (i.e., "moderate severity" reaction conditions). Resid conversion in the first reaction stage may be in the range from about 30 wt % to about 80 wt % in some embodiments.

The reaction product from the first stage may then be separated to recover at least one distillate hydrocarbon fraction and a resid faction including unreacted resid feed, asphaltenes, and any resid-boiling range products resulting from hydrocracking of the asphaltenes contained in the resid feedstock. Distillate hydrocarbon fractions recovered may include, among others, atmospheric distillates, such as hydrocarbons having a normal boiling temperature of less than about 340° C., and vacuum distillates (VGO), such as hydrocarbons having a normal boiling temperature of from about 450° C. to about 600° C.

The resid fraction may then be separated in a solvent deasphalting unit to recover a deasphalted oil fraction (PAO) and an asphaltenes fraction. The solvent deasphalting unit may be, for example, as described in one or more of U.S. Pat. Nos. 4,239,616, 4,440,633, 4,354,922, 4,354,928, 4,536,283, and 7,214,308, each of which is incorporated herein by reference to the extent not contradictory to embodiments disclosed herein, in the solvent deasphalting unit, a light hydrocarbon solvent may be used to selectively dissolve desired components of the resid fraction and reject the asphaltenes. In some embodiments, the light hydrocarbon solvent may be a $C_3$ to $C_7$ hydrocarbon, and may include propane, butane, isobutane, pentane, isopentane, hexane, heptane, and mixtures thereof.

The deasphalted oil fraction may be reacted with hydrogen over a hydrocracking catalyst in a second hydrocracking reaction stage to convert at least a portion of the hydrocarbons to lighter molecules. The reaction product from the second hydrocracking reaction stage may then be separated in a dedicated separation system or along with the reaction product from the first hydrocracking stage to recover distillate range hydrocarbons, among other reaction products. In some embodiments, the deasphalted oil fraction can be sent to a gasoil hydrocracker or to an RFCC unit. In these cases, the SDA lift should be limited to meet the feed oil quality requirements of either the hydrocracker or RFCC.

Processes according to embodiments disclosed herein thus include a solvent deasphalting unit downstream of the first hydrocracking reaction stage, providing for conversion of at least a portion of the asphaltenes to lighter, more valuable hydrocarbons. Hydrocracking of asphaltenes in the first reaction stage may provide for overall resid conversions that may be greater than about 60 wt % in some embodiments; greater than 85 wt % in other embodiments; and greater than 95 wt % in yet other embodiments. Additionally, due to conversion of at least a portion of the asphaltenes upstream, the required size for solvent deasphalting units used in embodiments may be less than would be required where the entire resid feed is initially processed. Overall resid conversion may be about 90%.

When operating for maximum resid conversion, catalysts used in the first and second reaction stages may be the same or different. Catalysts used in the first reaction stage include larger pore demetallization and desulfurization catalysts having active metals content typically ranging from 3 to 12 wt % and pore volumes typically ranging from 0.7 to 1.0 cc/gm. The catalysts used in the second reaction stage may be the same as one or more of the catalysts used in the first reaction stage allowing for reuse of the catalyst in the first reaction thereby reducing the overall catalyst addition rate. Alternatively the second reaction stage may use a dedicated smaller pore higher activity catalyst having active metals content typically ranging from 6 to 12 wt % and pore volumes typically ranging from 0.6 to 0.8 cc/gm. Suitable hydrotreating and hydrocracking catalysts usefill in the first and second reaction stages may include one or more elements selected from Groups 4-12 of the Periodic Table of the Elements. In some embodiments, the hydrotreating and hydrocracking catalysts according to embodiments disclosed herein may comprise, consist of, or consist essentially of one or more of nickel, cobalt, tungsten, molybdenum and combinations thereof, either unsupported or supported on a porous substrate such as silica, alumina, titanic, or combinations thereof. As supplied from a manufacturer or as resulting from a regeneration process, the hydroconversion catalysts may be in the form of metal oxides, for example. If necessary or desired, the metal oxides may be converted to metal sulfides prior to or during use. In some embodiments, the hydrocracking catalysts may be pre-sulfided and/or pre-conditioned prior to introduction to the hydrocracking reactor. For maximum conversion mode, ebullated-bed catalysts may be tailored to have good fluidization and good attrition resistance properties while also promoting resid hydrocracking with some heteroatom removal activity.

The first hydrocracking reaction stage may include one or more reactors in series and/or parallel. Reactors suitable for use in the first hydrotreating and hydrocracking reaction stage may include any type of hydrocracking reactor depending on the first stage operating severity. Ebullated bed reactors are preferred due to the processing of asphaltenes in the first reaction stage. In some embodiments, the first hydrocracking reaction stage includes only a single ebullated bed reactor.

The second reaction stage may include one or more reactors in series and/or parallel. Reactors suitable for use in the second reaction stage may include any type of reactor, including ebullated bed reactors and fixed bed reactors, among others. In some embodiments, the reactor may be one or more ebullated bed reactors. Asphaltenes may be present in the deasphalted oil only to a minor extent, thus a wide variety of reactor types may be used in the second reaction stage. For instance, fixed bed or a combination of fixed and ebullated bed reactors may be considered where the metals and Conradson carbon residue of the deasphalted oil fraction fed to the second reaction stage is less than 80 wppm and 10%, respectively. The number of reactors required may depend on the feed rate, the overall target resid conversion level, and the level of conversion attained in the first hydrocracking reaction stage.

In some embodiments, the ability to transition the second reaction stage from an operating mode maximizing hydrocracking conversion and middle distillate/diesel production to a hydrotreating operating mode that minimizes hydrocracking conversion while maximizing the quality of effluent destined to the RFCC/FCC provides refining flexibility which maximizes gasoline production by changing the catalyst and operating conditions of the multi stage reactors. In some embodiments, the second reaction stage is one or more ebullated bed reactors. Thus, the transition between the two operating modes may occur without shutting down or losing production capacity by incrementally and reversibly (i) sending a combined DAO and VGO stream to the second reaction stage; (ii) switching the makeup catalyst type in the second reaction stage to a hydrotreating-type catalyst and maintaining the catalyst makeup rate, which may occur over a few weeks duration at which time the conventional hydrocracking catalyst inventory will have been replaced by the ebullated hydrotreating-type catalyst; and (iii) running the second reaction stage in a hydrotreating mode rather than a hydrocracking mode. During this transition, the second reaction stage reactor temperature may be significantly lowered to reduce hydrocracking conversion severity while simultaneously increasing VGO quality.

In some embodiments, the deasphalted oil fraction (DAO) and vacuum distillates (VGO) may be reacted with hydrogen over a hydrotreating catalyst in the second. hydrotreating reaction stage to provide an improved feedstock for gasoline manufacture in an RFCC unit. By hydrotreating the VGO, the nitrogen and CCR/metals content may be lowered providing a suitable RFCC feed. The reaction product from the second hydrotreating reaction stage may be stripped and then separated into the improved RFCC feedstock and a stripped reaction product which is combined with the reaction product from the first hydrocracking stage to recover distillate range hydrocarbons.

When the second reaction stage is operating to produce feed for a downstream RFCC unit, the catalyst in the second reaction stage may be a high activity/high surface area/low pore volume hydrotreating catalyst. Hydroprocessing catalysts will operate under lower fluidization conditions and may not have incrementally higher attrition resistances but have higher surface areas and pore volumes to allow enhanced catalysis of the desired hydrodesulfurization and hydroderdtrogenation activities. The catalyst may have physical properties of particle size distribution, size and shape designed to provide maximum attrition resistance under reactor operating conditions of minimal catalyst bed expansion but may have active metals composition and support, BET surface area and pore size distribution designed for providing high activity towards hydrodesulfurization (HDS) and hydrodenitrogenation (HDN) activity. The particle size distribution and particle shape may provide low pressure drop characteristics, particularly under a range of bed expansions. The bed expansions under the hydrocracking mode may be in excess of 40%. For catalysts used for the mode in which feed is being produced for a downstream RFCC unit, the bed expansions could range from about 5% to about 40%; and about 25% to about 40% and about 5% to about 25%.

Hydrotreating catalysts that may be useful include catalysts selected from those elements known to provide catalytic hydrogenation activity. At least one metal component selected from Group 8-10 elements and/or from Group 6 elements is generally chosen. Group 6 elements may include chromium, molybdenum and tungsten. Group 8-10 elements may include iron, cobalt, nickel, ruthenium, rhodium, palladium, osmium, iridium and platinum. The amount(s) of hydrogenation component(s) in the catalyst suitably range from about 0.5% to about 10% by weight of Group 8-10 metal component(s) and from about 5% to about 25% by weight of Group 6 metal component(s), calculated as metal oxide(s) per 100 parts by weight of total catalyst, where the percentages by weight are based on the weight of the catalyst before sulfiding. The hydrogenation components in the catalyst may be in the oxidic and/or the sulphidic form. If a combination of at least a Group 6 and a Group 8 metal component is present as (mixed) oxides, it will be subjected to a sulfiding treatment prior to proper use in hydrocracking. In some embodiments, the catalyst comprises one or more components of nickel and/or cobalt and one or more components of molybdenum and/or tungsten or one or more components of platinum and/or palladium. Catalysts containing nickel and molybdenum, nickel and tungsten, platinum and/or palladium are useful, The fractionating of effluents from first and second reaction stages can be achieved in separate, independent fractionation systems, or in some embodiments, in a common fractionation system. Furthermore, it is contemplated that the reaction product from the second stage may he separated along with or independently from the reaction product from the first stage reaction. In some embodiments, the first and second reaction stages can be fed by and also feed a common gas cooling, purification and compression loop.

The hydrocracking reaction in the first stage may be conducted at a temperature in the range from about 360° C. to about 450° C.; from about 400° C. to about 440° C. in other embodiments. Pressures in the first reaction stage may be in the range from about 70 bara to about 230 bara in some embodiments; from about 100 to about 180 bara in other embodiments. The hydrocracking reactions may also be conducted at a liquid hourly space velocity (LHSV) in the range from about 0.1 hr$^{-1}$ to about 3.0 hr$^{-1}$ in some embodiments; from about 0.2 hr$^{-1}$ to about 2 hr$^{-1}$ in other embodiments.

The hydrocracking reaction in the second reaction stage may be conducted at a temperature in the range from about 400° C. to about 450° C.; from about 420° C. to about 440° C. in other embodiments. Pressures in the second reaction stage may be in the range from about 70 bara to about 230 bara in some embodiments; from about 100 to about 180 bara in other embodiments. The hydrocracking reactions may also be conducted at a liquid hourly space velocity (LHSV) in the range from about 0.1 hr$^{-1}$ to about 1.0 hr$^{-1}$ in some embodiments; from about 0.2 hr$^{-1}$ to about 0.5 hr$^{-1}$ in other embodiments.

When the second reaction stage is operating to maximize RFCC feed, the hydrotreating reaction may be conducted at a temperature in the range from about 350° C. to about 410° C.; from about 360° C. to about 385° C. in other embodiments. Pressures in each of the first and second reaction stages may be in the range from about 70 bara to about 230 bara in some embodiments; from about 100 to about 180 bara other embodiments. The hydrotreating reactions may also be conducted at a liquid hourly space velocity (LHSV) in the range from about 0.1 hr$^{-1}$ to about 1.0 hr$^{-1}$ in some embodiments; from about 0.2 hr$^{-1}$ to about 0.5 hr$^{-1}$ in other embodiments.

The flexibility to operate the second reaction stage may be achieved by transitioning from the maximum resid conversion mode to the quality effluent mode. The transition between the modes may occur by changing the operating conditions of the second reaction stage and by replacing the hydrocracking catalyst with a hydrotreating catalyst while the second reaction stage remains on-stream. When transitioning from the maximum resid conversion mode to the quality effluent mode, in some embodiments, the temperature of the second reaction stage is lowered while the feed to the second reaction stage may have additional amounts of VGO added. The total amount of VGO in the second reaction stage feed added may range from about 15 wt % to about 75 wt % of the total feed. The second reaction stage operating conditions and parameters are set to achieve the optimal levels of HDS and HDN removal under reduced DAO conversion levels to maximize gasoline production. While the feed is changing, the temperature of the second reaction stage may be lowered, dependent on the feed makeup to the second reaction stage. The temperature may be decreased by an amount ranging from about 1 to 10 ° C. at a rate from about 0.1° C./hour to about 5° C./hour. Additionally, in the quality effluent mode the second stage unconverted oil, consisting of material boiling from about 343° C. to 900° C. and from 360° C. to 700° C. in some embodiments is segregated from the first stage unconverted oil. The conditions for transitioning from the maximum resid conversion mode to the quality effluent mode may be reversed to transition from the quality effluent mode to the maximum resid conversion mode.

In some embodiments, the second reaction stage further operates at a catalyst bed expansion of greater than or equal to about 30% and more typically between about 40% and about 60%; and a catalyst makeup feed rate equivalent to one complete catalyst bed turnover in 40 to 80 operating days on-stream operation. The catalyst withdrawal rate may be equivalent to the catalyst makeup feed rate such that the catalyst inventory in the reactor remains constant.

The transition from maximum resid conversion mode to the quality effluent mode begins with reducing the high conversion hydrocracking catalyst inventory in the second stage reactor by increasing the spent catalyst withdrawal rate and stopping the addition of the catalyst makeup whilst concurrently reducing reactor temperatures accordingly to satisfy performance objectives. During this step, the ebullating pump (of the ebullating bed reactor system) may have its speed increased to achieve a higher bed expansion of the depleting amount of catalyst inventory occurring during this operation. This step should take from about 15 days to about 25 days. It is envisaged that about 20 to 40% of the catalyst inventory will be removed during this step.

Second, the inventory of the hydrocracking catalysts in the catalyst inventory holding bin is replaced with the attrition resistant, higher activity hydrotreating catalyst and the add fresh makeup catalyst to the second reaction stage at a rate to get about 80% to about 100% replacement of the remaining catalyst inventory in about 45 days to 60 days while periodically adjusting the catalyst withdrawal rate from a high rate in the first step of the transition to its equilibrium rate, i.e., the rate when the makeup rate is equivalent to the withdrawal rate and the physical properties of the spent catalyst may confirm that the hydrocracking catalysts have been purged from the reactor. Subsequently the catalyst inventory is reestablished to 100 to 125% of its original inventory by continuing to add catalyst while stopping catalyst withdrawals. During equilibrium operation the normal turnover rate for the quality effluent mode is about 180 days to about 330 days.

Third, the reactor temperature is lowered during the latter parts of the second transition step by about 10° C. to about 30° C. to achieve a reactor temperature range of from about 350° C. to about 410° C. During this step, the ebullating pump speed may be decreased to get a bed expansion with the hydrotreating catalysts in the range of from about 30% to about 40% in one embodiment and from about 25% to about 40% in another embodiment and from about 15% to about 40% in another embodiment and from about 10% to about 40% in another embodiment and from about 5% to about 40% in another embodiment.

To return to the maximum resi.d conversion mode from the quality effluent mode, the transition steps may be reversed from the above described procedures.

The system as described above may operate in a maximum conversion mode or to produce a quality effluent, preferably to be fed to an RFCC unit. The ability to transition from the maximum conversion mode to the quality effluent mode without shutting down or losing production capacity is advantageous. The transition may be effected by reversibly (i) sending a combined feed stream, preferably including DAO and VGO, to the second reaction stage, which is an ebullated bed reaction stage; (ii) switching the makeup catalyst type in the second reaction to an ebullated hydrotreating-type catalyst, such that the catalyst change would occur over a 6 to 12 week period at which time the conventional hydrocracking catalyst inventory will have essentially been replaced by the ebullated hydrotreating-type catalyst; and (iii) running the second reaction stage in a quality effluent mode rather than a hydrocracking mode. In some embodiments, the quality effluent mode lowers the second reaction stage temperature, thus reducing hydrocracking conversion severity while simultaneously increasing VGO quality.

Operating conditions in the first reaction stage are substantially similar for both the maximum resid conversion mode and the quality effluent mode. Operating conditions may be selected based upon the resid feedstock, including the content of impurities in the resid feedstock and the desired level of impurities to he removed in the first stage, among other factors. Operating temperatures under the maximum conversion mode may be higher in the second stage reactor than those in the first stage reactor. Operating temperatures under the quality effluent mode may be lower in the second stage reactor than those in the first stage reactor.

In some embodiments, resid conversion in the first reaction stage may be in the range from about 40 to about 70 wt %; from about 55 to about 65 wt % in other embodiments. Hydrocarbon conversion (or resid conversion or conversion) may be defined as the quantity of material in the reactor feed stream boiling above a temperature threshold hereafter described minus the quantity of the material in the reactor effluent stream boiling above that same temperature threshold with said difference divided by the quantity of material in the reactor feed stream boiling above the temperature threshold. In some embodiments, the threshold temperature may be defined as 525° C.+; in other embodiments the threshold temperature may be defined as, 540° C.+ and in other embodiments the threshold temperature may be defined as 565° C.+.

Operating conditions in the second reaction stage depend on the mode of operation, including the maximum resid conversion mode, the quality effluent mode, or transitioning between the modes. For overall maximum resid conversion mode, resid conversion in the second reaction stage may be in the range from about 50 to about 900 wt %; from about 60 to about 80 wt % in other embodiments. When operating the second stage for maximum resid conversion, overall resid conversion (from feed to lower boiling material product) may be in the range from about 50 to about 95 wt %; from about 60 to about 92 wt % in other embodiments and 85 to 90 wt % in yet other embodiments. In addition to hydrocracking the resid, overall sulfur and metal removal May each be in the range from about 60% to about 90%, and Comadson carbon removal may be in the range from about 40% to about 80%. In some embodiments, at least one of an operating temperature and an operating pressure in the first reaction stage may be greater than used in the second reaction stage.

When operating in maximum conversion mode, overall resid conversions for processes according to embodiments disclosed herein may be greater than 80% due to the partial conversion of asphaltenes in the first reaction stage and the conversion of DAO in the second reaction stage. In the maximum conversion mode, according to embodiments disclosed herein, overall resid conversions of at least 80%, 85%, 90%, 95% or higher may be attained, which is a significant improvement over what can be achieved with a two-stage hydrocracking system alone.

For quality effluent mode, resid conversion in the second reaction stage may be in the range from about 5 to about 20 wt %; from about 10 to about 15 wt % in other embodiments. When operating the second stage for quality effluent, overall resid conversion (from feed to lower boiling material product) may be in the range from about 45 to about 82 wt %; from about 70 to about 80 wt % in other embodiments. In addition to hydrocracking the resid, overall sulfur and metal removal may each be in the range from about 70% to about 90%, and Conradson carbon removal may be in the range from about 50% to about 80%. In some embodiments, at least one of an operating temperature and an operating pressure in the first reaction stage may be greater than used in the second reaction stage.

When transitioning between the maximum resid conversion mode and the quality effluent mode, the operating conditions in the second reaction stage will be changing while the operating conditions in the first reaction stage may remain substantially the same. For example, the temperature in the second reaction stage will be reduced. Operating conditions may be selected based upon the catalyst makeup rate, the increasing amount of VGO in the feedstock to the second reaction stage and the desired product quality from the second stage, among other factors. In some embodiments, resid conversion during transitioning in the second reaction stage may be in the range from about 25 to about 75 wt %; from about 50 to about 60 wt % in other embodiments; and less than 50 wt % in yet other embodiments.

Figure 1:
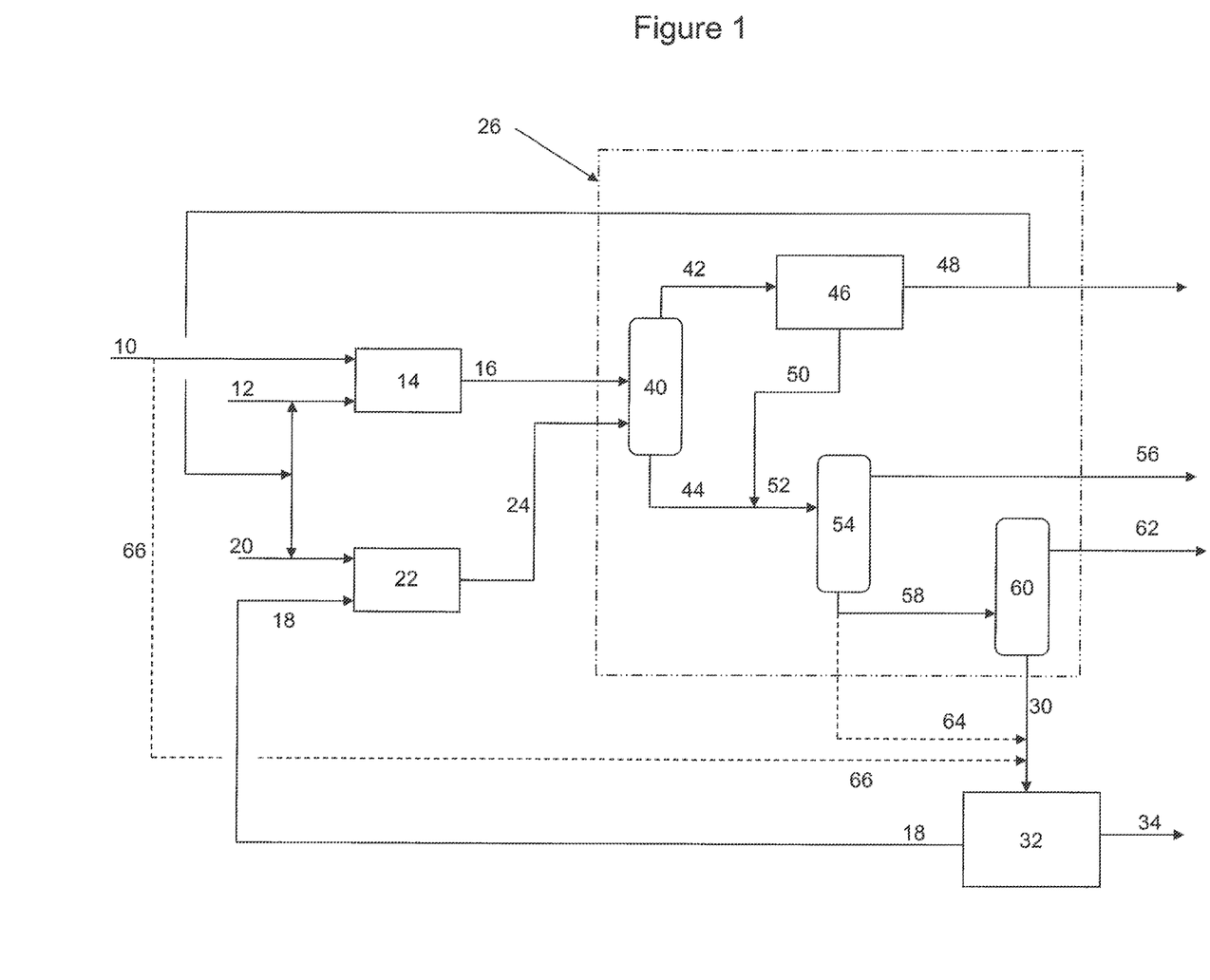
FIG. 1 is a simplified flow diagram of a hydrocracking, and deasphalting process according to embodiments disclosed herein.

Referring now to FIG. 1, a simplified process flow diagram of processes for upgrading resid according to embodiments disclosed herein is illustrated. Pumps, valves, heat exchangers, and other equipment are not shown for ease of illustration of embodiments disclosed herein. FIG. 1 discloses operating the system in the maximum conversion mode.

A resid and hydrogen may be fed via flow lines 10 and 12, respectively, to a first hydrocracking reaction stage 14 containing a hydrocracking catalyst and operating at a temperature and pressure sufficient to convert at least a portion of the resid to lighter hydrocarbons. The first stage reactor effluent may be recovered via flow line 16. As described above, the first stage effluent may include reaction products and unreacted resid, which may include unreacted feed components such as asphaltenes, and hydrocracked asphaltenes having various boiling points, including those in the boiling range of the resid feedstock. The first hydrocracking reaction stage 14 may be operated at temperatures ranging from about 360° C. to about 450° C.

A deasphalted oil fraction and hydrogen may be fed via flow lines 18 and 20, respectively, to a second reaction stage 22 containing a hydrocracking catalyst and operating at a temperature and pressure to convert at least a portion of the deasphalted oil to lighter hydrocarbons. The second stage reactor effluent may be recovered via flow line 24. The second reaction stage 22 may be an ebullated reaction stage operated at temperatures ranging from about 400° C. to about 440° C. In some embodiments, the second reaction stage may be operated as a fixed bed, The first stage effluent and the second stage effluent in flow lines 16, 24 may then be fed to a separation system 26. In separation system 26, the first and second stage effluents may be fractionated to recover at least one distillate hydrocarbon fraction and a hydrocarbon fraction including the unreacted resid, asphaltenes, and similar boiling range compounds formed from hydrocracking of the asphaltenes.

In this embodiment, separation system 26 may include a high pressure high temperature separator 40 (HP/HT separator) for separating the effluent into a liquid and a vapor. The separated vapor may be recovered via flow line 42, and the separated liquid may be recovered via flow line 44.

The vapor may then be directed via flow line 42 to a gas cooling, purification, and recycle compression system 46. A hydrogen-containing gas may be recovered from system 46 via flow line 48, a portion of which may be recycled to reactors 14, 16. Hydrocarbons condensed during the cooling and purification may be recovered via flow 50 and combined with the separated liquid in flow line 44 for further processing. The combined liquid stream 52 may then be fed to an atmospheric distillation tower 54 to separate the stream into a fraction including hydrocarbons boiling in a range of atmospheric distillates and a first bottoms fraction including hydrocarbons having a normal boiling point of at least 340° C. The atmospheric distillates may be recovered via flow line 56, and the first bottoms fraction may be recovered via flow line 58.

The first bottoms fraction may then be fed to a vacuum distillation system 60 for separating the first bottoms fraction into a fraction including hydrocarbons boiling in a range of vacuum distillates and a second bottoms fraction including hydrocarbons having a normal boiling point of at least 480° C. The vacuum distillates may be recovered via flow line 62, and the second bottoms fraction may be recovered via flow line 30 and processed in the solvent deasphalting unit 32 as described above.

It may be necessary to reduce the temperature of the second bottoms fraction prior to feeding the second bottoms fraction to the solvent deasphalting unit 32. The second bottoms fraction may be cooled via indirect or direct heat exchange. Due to fouling of indirect heat exchange systems that often occurs with vacuum tower residues, direct heat exchange may be preferred, and may be performed, for example, by contacting the second bottoms fraction with at least one of a portion of the first bottoms fraction and a portion of the neat resid feed, such as may be fed via flow lines 64 and 66, respectively.

The hydrocarbon fraction including the unreacted resid and asphaltenes may be fed via flow line 30 to solvent deasphalting unit 32 to produce an asphaltenes fraction recovered via flow line 34 and a deasphalted oil fraction. The deasphalted oil fraction may be recovered from solvent deasphalting unit 32 via flow line 18 and fed to second hydrocracking reaction stage 22, as described above.

Figure 2:
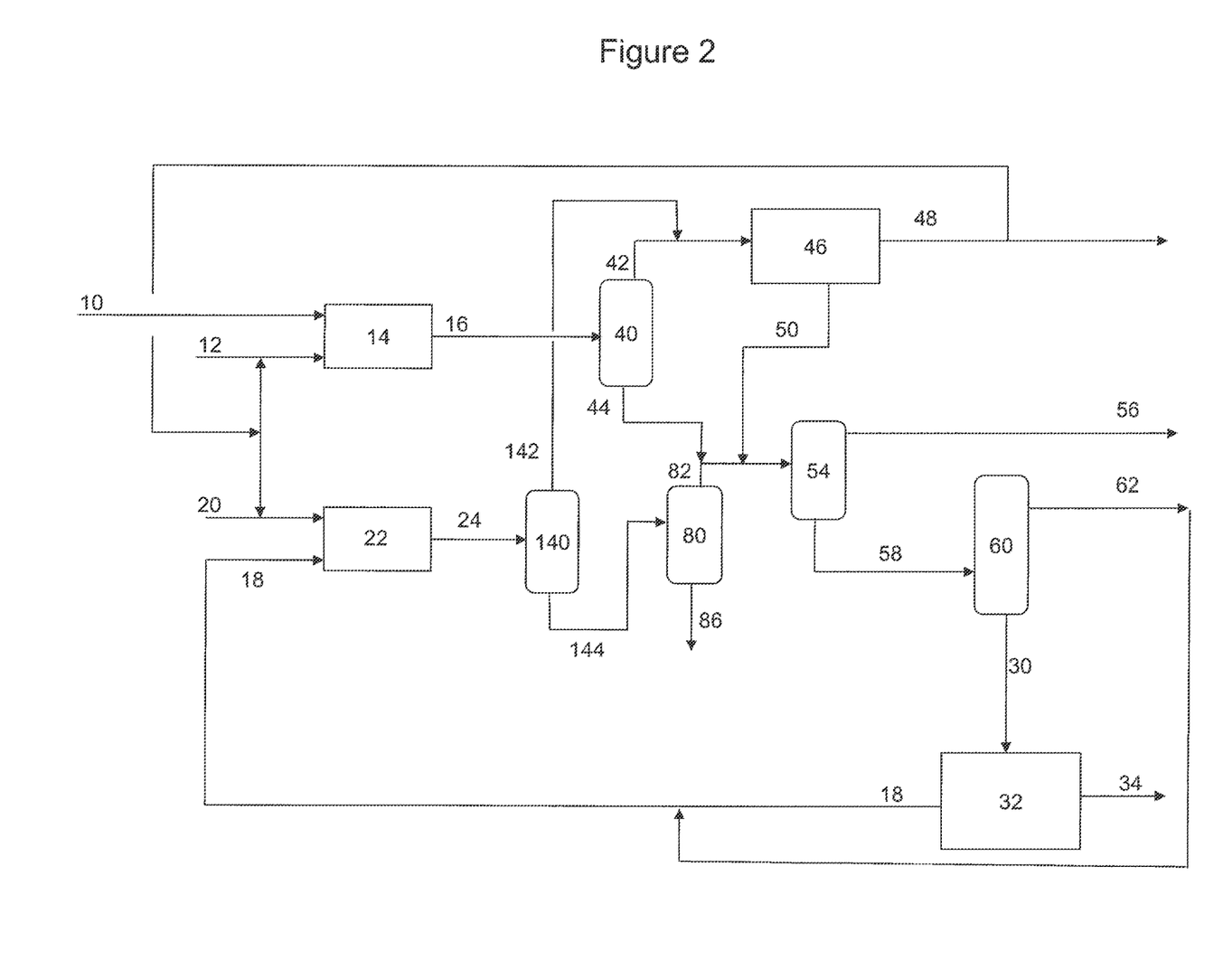
FIG. 2 is a simplified flow diagram of a hydrocracking and deasphalting process according to embodiments disclosed herein.

Referring now to FIG. 2, a simplified process flow diagram of processes for upgrading resid according to embodiments disclosed herein is illustrated, where like numerals represent like parts. FIG. 2 discloses operating the system in the quality effluent mode.

As previously described, the resid and hydrogen may be fed via flow lines 10 and 12, respectively, to the first hydrocracking reaction stage 14 containing a hydrocracking catalyst and operating at a temperature and pressure sufficient to convert at least a portion of the resid to lighter hydrocarbons. The first stage reactor effluent may be recovered via flow line 16 and fed to the high pressure high temperature separator 40 (HP/HT separator) for separating the effluent liquid and vapor. The separated vapor may be recovered via flow line 42, and the separated liquid may be recovered via flow line 44. As described above, the first stage effluent may include reaction products and unreacted resid, which may include unreacted feed components such as asphaltenes, and hydrocracked asphaltenes having various boiling points, including those in the boiling range of the resid feedstock. The first hydrocracking reaction stage 14 may be operated at temperatures ranging from about 360° C. to about 450° C., for example.

The deasphalted oil fraction, the vacuum distillates and hydrogen may be fed via flow lines 18, 62 and 20, respectively, to the second reaction stage 22 containing a hydrotreating catalyst and operating at a temperature and pressure to convert at least a portion of the deasphalted oil to lighter hydrocarbons and remove sulfur, nitrogen and metals. The conditions in the second reaction stage will also be adapted to be suitable for minimizing conversion and producing an effluent suitable for feeding to an RFCC unit. The second reaction stage 22 may be an ebullated reaction stage operated at temperatures ranging from about 350° C. to about 410° C., for example.

The second stage reactor effluent may be recovered via flow line 24 and fed to a high pressure high temperature separator 140 (HP/HT separator) for separating the effluent liquid and vapor. The separated vapor may be recovered via flow line 142, and the separated liquid may be recovered via flow line 144.

The vapor may then be directed via flow line 142 to the gas cooling, purification, and recycle compression system 46 along with the separated vapor recovered via flow line 42. Hydrocarbons condensed during the cooling and purification may he recovered via flow 50 and combined with the separated liquid in flow line 44 for further processing, such as the atmospheric distillation tower 54.

The second stage separated liquid may then be directed via flow line 144 to a stripper system 80 to generate a stripper bottoms and a stripper overhead. The stripper bottoms may be recovered via flow line 86 and sent for further processing. In some embodiments, the stripper bottoms 86 may be sent to a resid fluidized catalytic cracking (RFCC) unit. The stripper system 80 is operated to produce a 370+° C. resid product in the stripper bottoms and a diesel and lighter fraction in the overheads. The stripper overhead may be fed via flow line 82 to the atmospheric distillation tower 54. The stripper overhead may be combined with the hydrocarbons condensed during the cooling and purification via flow 50 and the separated liquid in flow line 44. The atmospheric distillates may be recovered via flow line 56, and the first bottoms fraction may be recovered via flow line 58, as described above, The vacuum distillates via flow line 62 may be fed to the second stage reactor 22 along with the DAO via flow line 18 from the solvent deasphalting unit 32 as described above.

Figure 3:
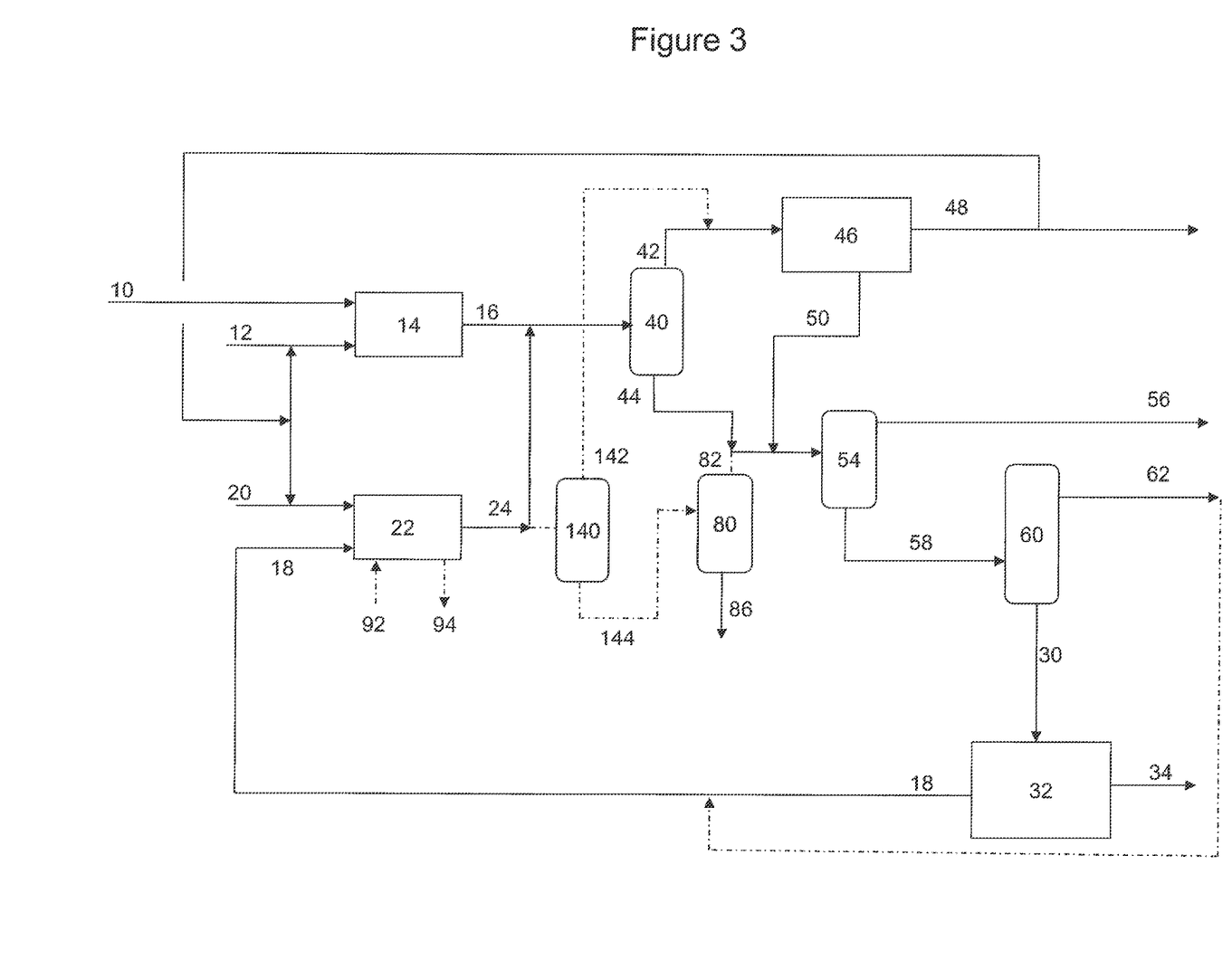
FIG. 3 is a simplified flow diagram FIG. 1 transitioning from the flow diagram of FIG. 2 to the flow diagram of FIG. 1 according to embodiments disclosed herein.
Figure 4:
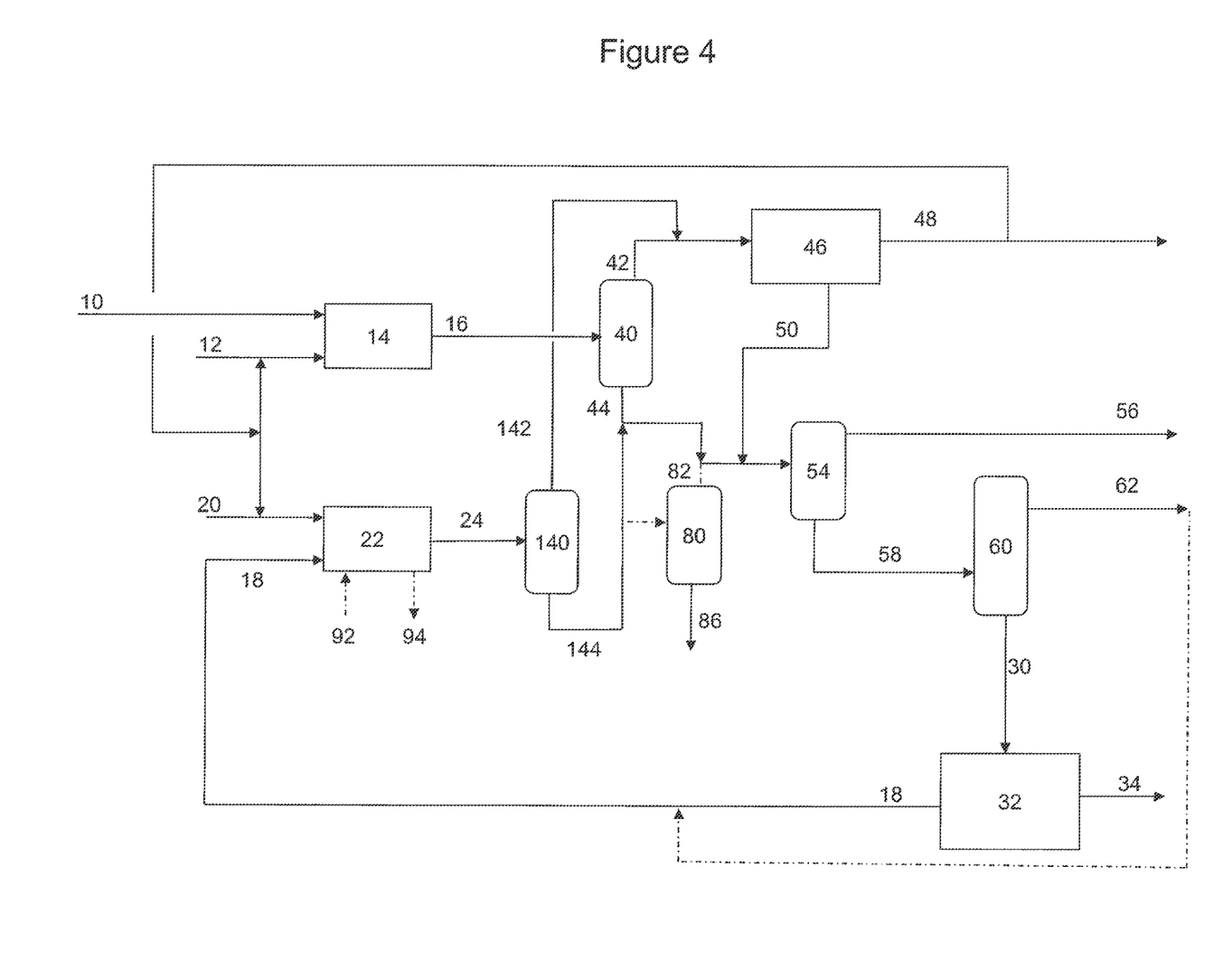
FIG. 4 is a simplified flow diagram for transitioning from the flow diagram of FIG. 2 to the flow diagram of FIG. 1 according to embodiments disclosed herein.

FIG. 1 and FIG. 2 describe embodiments of a process system that work in different operating modes. The process system may be reversibly transitioned between the different operating modes shown in FIGS. 1 and 2. The operating modes differ in the operation of the second stage reactor 22. The first mode of the second stage reactor is operated to maximize conversion with a first catalyst as described with respect to FIG. 1 and the second mode of the second stage reactor is to minimize conversion and maximize the quality of the effluent destined for the RFCC with a second catalyst. The ability to reversibly transition between the two modes without shutting down the system or losing production may be achieved via flexible piping configurations and switching the catalyst type in the catalyst makeup to the second stage reactor 22. As illustrated in FIG. 3, catalyst replacement in the second stage reactor 22 occurs via flow lines 92 and 94. The continuous feed/continuous catalyst withdrawal feature of ebullated bed hydroprccessing reactors makes the replacement of catalyst seamless. The catalyst changeover may occur over a period of 6 to 12 weeks. In some embodiments, the catalyst changeover may depend on the relative feed rates of the catalyst being fed into the second reaction stage. In some embodiments, three reactor volumes of catalyst may be necessary for near complete turnover. In some embodiments, the changeover may occur faster if desired, but under typical operating/fresh catalyst feed/spent withdrawal rates, the catalyst changeover may take several weeks. The gradual replacement of catalyst may allow time for downstream units to effectively transition to the new product mix, etc. Ebullated bed high pore volume reside hydrocracking ("conversion") catalyst may exit the second stage reactor 22 via flow line 94 and a high activity/high surface are allow pore volume hydrotreating catalyst may enter the second stage reactor 22 via flow line 92. The replacement may occur in situ and without having to shut down for said catalyst replacement. The process systems of FIGS. 1 and 2 may also have piping flexibility which permits the effluent from the second stage reactor able to be sent to either separator 40 or HP/FIT separator 140 as shown in FIG. 3. Piping flexibility may also provide the vacuum distillates to be sent to the second stage reactor, As shown in FIG. 4, piping flexibility may be provided such that the stripper 80 may be bypassed. Thus, the liquids from the H separator 140 may be combined with the liquids from the HP/HT separator 40 to be sent to the atmospheric distillation tower 54 and the vapor from the HP/HT separator 140 may be combined with the vapor from the HP/HT separator 40 to be sent to the gas cooling, purification, and recycle compression system 46. Furthermore, in some embodiments, various separation stages may be integrated/combined where similar separations are being performed.

In some embodiments, the transition from the maximum resid conversion mode to the quality effluent mode involves changing the flow of feed and products while also adjusting the catalyst within the second reaction stage and the operating conditions in the second stage. In some embodiments, the feed to the second reaction stage 22 is adjusted to include the vacuum distillates from flow line 62. The vacuum distillates may be added incrementally to the feed to the second reaction stage 22 from an amount of about 0% of the feed to about 50% of the feed. In some embodiments, the effluent from the second stage reactor 22 may be routed from the HP/HT separator 40 to the HP/HT separator 140. This may occur by gradually rerouting the effluent via flow line 24 to be sent to the HP/HT separator 140. The separated vapor recovered via flow line 142. may be routed to the recycle compression system 46 by opening associated valves and piping. The separated liquid recovered via flow line 144 is routed to the stripper system 80 by opening associated valves and piping. Catalyst changeover from hydrocracking catalyst to hydrotreating catalyst occurs by transitioning the catalyst to and from the second stage reactor 22 ebullated bed by reducing the amount of hydrocracking catalyst being fed to the second stage reactor via line 92 while increasing the amount of hydrotreating catalyst being fed to the second stage reactor. To reverse the operation of the second stage reactor back to maximum resid conversion mode, the same adjustments above are done in reverse.

Figure 5:
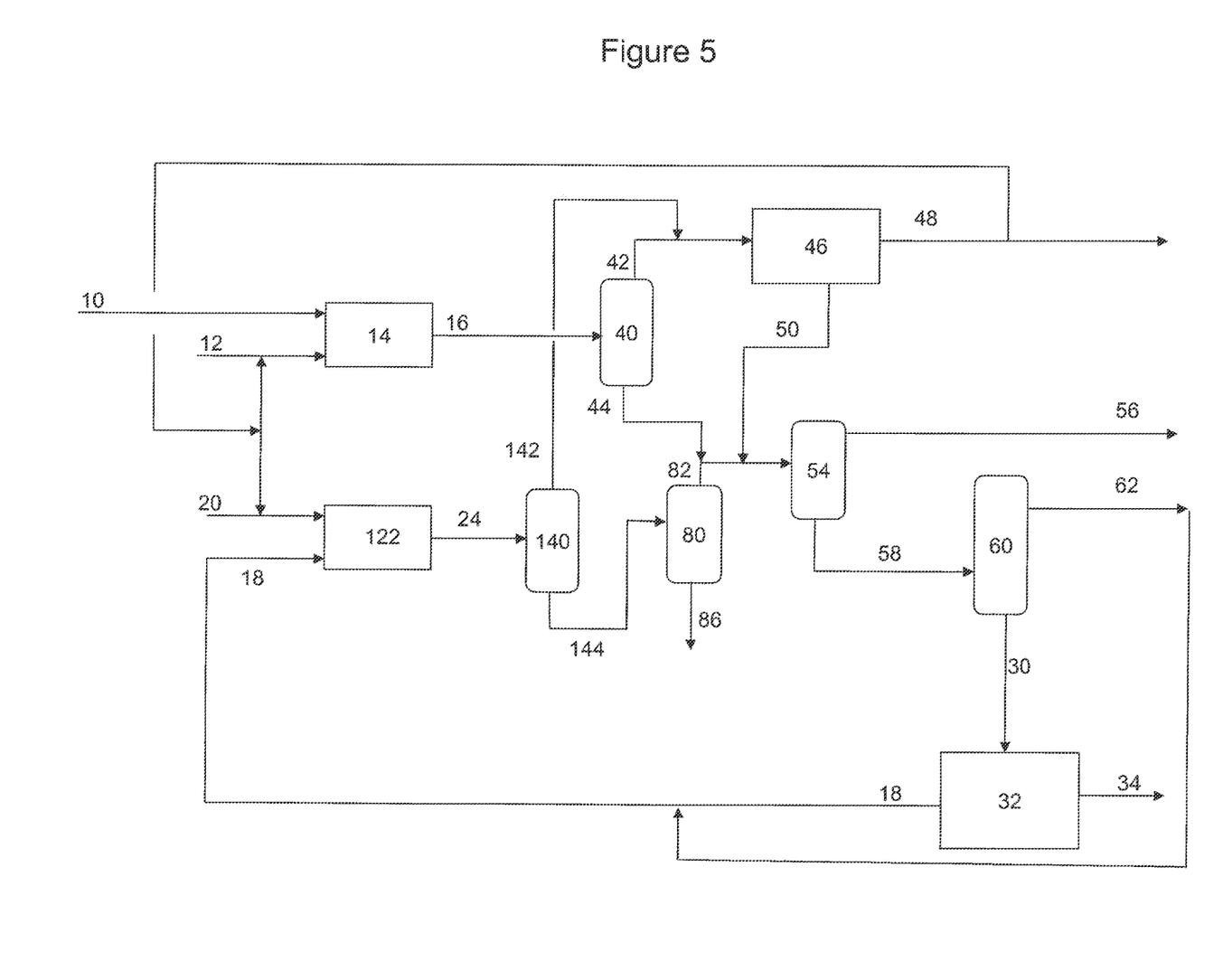
FIG. 5 is a simplified flow diagram of a hydrocracking and deasphalting process according to embodiments disclosed herein.

Referring now to FIG. 5, a simplified process flow diagram of processes for upgrading resid according to embodiments disclosed herein is illustrated, where like numerals represent like parts. FIG. 5 discloses operating the system in another quality effluent mode and may eliminate the limitations on feed (VR) contaminant level of a typical RDS unit upstream of a RFCC while still producing a high quality feed to the RFCC.

As previously described, the resid and hydrogen may be fed via flow lines 10 and 12, respectively, to the first hydrocracking reaction stage 14 containing a hydrocracking catalyst and operating at a temperature and pressure sufficient to convert at least a portion of the resid to lighter hydrocarbons. The first stage reactor effluent may be recovered via flow line 16 and fed to the high pressure high temperature separator 40 (HP/HT separator) for separating the effluent liquid and vapor. The separated vapor may be recovered via flow line 42, and the separated liquid may be recovered via flow line 44. As described above, the first stage effluent may include reaction products and unreacted resid, which may include unreacted feed components such as asphaltenes, and hydrocracked asphaltenes having various boiling points, including those in the boiling range of the resid feedstock. The first hydrocracking reaction stage 14 may be operated at temperatures ranging from about 360° C. to about 450° C., for example.

The deasphalted oil fraction, the vacuum distillates and hydrogen may be fed via flow lines 18, 62 and 20, respectively, to the second reaction stage 22 containing hydrotreating catalyst and operating at a temperature and pressure to convert at least a portion of the deasphalted oil to lighter hydrocarbons and remove sulfur, nitrogen and metals. The conditions in the second reaction stage will also be adapted to be suitable for minimizing conversion and producing an effluent suitable for feeding to an RFCC unit. The second reaction stage 122 may be a fixed bed stage operated at temperatures ranging from about 350° C. to about 410° C., for example.

The second stage reactor effluent may be recovered via flow line 24 and fed to a high pressure high temperature separator 140 (HP/HT separator) for separating the effluent liquid and vapor. The separated vapor may be recovered via flow line 142, and the separated liquid may be recovered via flow line 144. In some embodiments, the HP/HT separator 140 may be optional.

The vapor may then be directed via flow line 142 to the gas cooling, purification, and recycle compression system 46 along with the separated vapor recovered via flow line 42. Hydrocarbons condensed during the cooling and purification may be recovered via flow 50 and combined with the separated liquid in flow line 44 for further processing, such as in atmospheric distillation tower 54.

The liquid may then be directed via flow line 144 to a stripper system 80 to generate a stripper bottoms and a stripper overhead. The stripper bottoms may be recovered via flow line 86 and sent for further processing. In some embodiments, the stripper bottoms may be sent to a resid fluidized catalytic cracking (RFCC) unit. The stripper system 80 is operated to produce a 370+° C. resid product in the stripper bottoms and a diesel and lighter fraction in the overheads. The stripper overhead may be fed via flow line 82 to the atmospheric distillation tower 54. The stripper overhead may be combined with the hydrocarbons condensed during the cooling and purification via flow 50 and the separated liquid in flow line 44. The atmospheric distillates may be recovered via flow line 56, and the first bottoms fraction may be recovered via flow line 58, as described above.

The vacuum distillates via flow line 62 may be fed to the second stage reactor 22 along with the DAO via flow line 18 from the solvent deasphalting unit 32 as described above.

As illustrated in FIGS. 1, 2 and 5, processes disclosed herein may include a stand-alone gas cooling, purification and compression system 46. In other embodiments, the vapor fraction recovered via flow line 42, or at least a portion thereof, may be processed in a common gas cooling, purification, and compression system, integrating the gas processing with other hydroprocessing units on site.

Although not illustrated, at least a portion of the asphaltenes recovered via flow line 34 may be recycled to the first hydrocracking reactor stage in some embodiments. Upgrading or otherwise using asphaltenes recovered via flow line 34 may be performed using other various processes known to one skilled in the art. For example, the asphaltenes may be blended with a cutter such as FCC slurry oil and used as fuel oil, or processed alone or in combination with other feeds in delayed coking or gasification units, or pelletized to asphalt pellets.

EXAMPLES

The following examples are derived from modeling techniques. Although the work has been performed, the Inventors do not present these examples in the past tense to comply with applicable rules.

Table 1 below show the range of conversions and reactor temperatures for embodiments of the two modes of operating for both reactor stages described herein. Conversion mode in the table is the system operating to maximize hydrocracking conversion/maximum diesel. Quality effluent mode in the table is the system operating to minimize hydrocracking conversion/maximize the quality of effluent. Data are not presented for operation in the transition modes, either transitioning from the conversion mode to the hydrotreating mode and vice versa.

TABLE 1

| Operating Mode | First Stage | Second Stage | Overall (2-Stage) Resid Conversion |
|---|---|---|---|
| MAXIMUM CONVERSION MODE | | | |
| Maximum % Conversion, range | 30-75 | 20-50 (on VR feed basis) | 80-95 |
| Maximum % Conversion, typical | 55-70 | 22-33 | 85-92 |
| Reactor Temperature, range | 360-450 C. | 400-440 C. | |
| Reactor Temperature, typical | 400-440 C. | 420-440 C. | |
| QUALITY EFFLUENT MODE | | | |
| Maximum % Conversion, range | 30-75 | 5-20 (on VR feed basis) | 25-80 |
| Maximum % Conversion, typical | 55-65 | 10-15 | 58-70 |
| Reactor Temperature, range | 360-450 C. | 350-410 C. | |
| Reactor Temperature, typical | 400-440 C. | 360-385 C. | |

Table 2 below shows the operation of the second stage reactor between the two modes of operating. Conversion mode in the table is the system operating to maximize hydrocracking conversion/maximum diesel. Quality effluent mode in the table is the system operating to minimize hydrocracking conversion/maximize the quality of effluent. Feedstock properties are typical but can vary depending on the crude source and first stage conversion levels. Data are not presented for operation in the transition modes, either transitioning from the conversion mode to the hydrotreating mode and vice versa.

TABLE 2

| Feed Properties | Conversion Mode | Quality Effluent mode |
|---|---|---|
| Feed | DAO + 20% HVGO | DAO + HVGO |
| API Gravity | 13 | 14.3 |
| Nitrogen, wppm | 3500 | 3000 |
| % CCR | 12 | 8 |
| Ni + V, wppm | 5.5 | 4.3 |
| Catalyst bed Expansion | 35-60% | 10-15% |
| Reactor Operating Conditions | | |
| Catalyst type | Amorphous NiMo/Al2O3 with high pore volume | High activity NiMO/Al2O3 with relativley low pore volume/higher surface area and attrition resistance |
| LHSV | 0.2 | 0.4 |
| Average Bed temperature, C. | 438 | 380 |
| Conversion of 566 + C. | 78 (per pass) | 15 (once through) |
| API gravity of heavy oil (370 C. + fraction) | 18 | 20.5 |
| Nitrogen in heavy oil, wppm | 2700 | 800 |
| Relative % HDN | 23 | 73 |
| Sulfur in heavy oil, wppm | 3600 | 100 |

As described above, embodiments disclosed herein provide for the efficient and flexible conversion of heavy hydrocarbons to lighter hydrocarbons via an integrated hydrocracking and solvent deasphalting process.

In another aspect, processes according to embodiments disclosed herein may provide for reducing the required size of processing equipment, including at least one of a hydrocracking reactor and a solvent deasphalting unit. High conversions attained may result in relative recycle rates less than required by prior art processes to achieve high overall conversions. Additionally, hydrocracking at least a portion of the asphaltenes in the first reaction stage may provide for decreased feed rates, solvent usage, etc., associated with the solvent deasphalting unit as compared to prior art processes.

In yet another aspect, processes according to embodiments disclosed herein may provide for decreased catalyst fouling rates, thereby extending catalyst cycle times and catalyst lifespan. For example, operating conditions in the first reaction zone may be selected to minimize sediment formation and catalyst fouling that may otherwise occur when hydrocracking asphaltenes.

Significant reductions in capital and operating costs may be realized due to one or more of the low recycle requirements, efficient catalyst usage, and partial conversion of asphaltenes prior to solvent deasphalting.

Removal of asphaltenes in between the reaction stages may additionally result in a lower sediment deposition problem in equipment associated with separation of liquid from vapor in the reactor effluent circuit, including equipment in the fractionation section.

While the disclosure includes a limited number of embodiments, those skilled in the art, having benefit of this disclosure, will appreciate that other embodiments May he devised which do not depart from the scope of the present disclosure. Accordingly, the scope should be limited only by the attached claims.

What is claimed:
1. A process for upgrading resid in a system comprising:
a first ebullated bed reactor;
a first separator;
a stripping tower;
a fractionation system; and
a solvent deasphalting system;
the process comprising:
  operating the system in a first mode to produce a feed for a residual fluid catalytic cracking (RFCC) unit, the first mode comprising:
    reacting a deasphalted oil and a vacuum distillate in the first ebullated bed reactor containing a hydrotreating catalyst to form a first effluent;
    separating the first effluent in the first separator into a first gas phase and a first liquid phase;
    stripping the first liquid phase in the stripping tower to produce a strippers bottom and a stripper overhead;
    fractionating the stripper overhead in the fractionation system to produce at least one atmospheric distillate and an atmospheric bottoms;
  fractionating the atmospheric bottoms in the fractionation system to produce the vacuum distillate and a vacuum bottoms;
  solvent deasphalting the vacuum bottoms in the solvent deasphalting system to produce the deasphalted oil; and transporting the strippers bottoms as the feed to the RFCC unit;
wherein the first mode is operated with a first particle size distribution providing low pressure drop under a range of bed expansions from 5% to 25%;
operating the system in a second mode to maximize the resid conversion in the first ebullated bed reactor, the second mode comprising:
reacting the deasphalted oil in the first ebullated bed reactor containing a hydrocracking catalyst to form a second effluent;
separating the second effluent in the first separator into a second gas phase and a second liquid phase;
fractionating the second liquid phase in the fractionation system to produce at least one atmospheric distillate and an atmospheric bottoms;
fractionating the atmospheric bottoms in the fractionation system to produce the vacuum distillate and the vacuum bottoms; and
solvent deasphalting the vacuum bottoms to produce the deasphalted oil;
wherein the second mode is operated with a second particle size distribution providing low pressure drop under a range of bed expansions from 40% to 60%;
transitioning the system between the first mode and the second mode, wherein the transitioning comprises:
removing the hydrotreating catalyst from the first ebullated bed reactor while simultaneously adding a hydrocracking catalyst to the first ebullated bed reactor and increasing a speed of an ebullating pump;
fractionating the first liquid phase in the fractionation system to produce the at least one atmospheric distillate and the atmospheric bottoms.

2. The process of claim 1, wherein the system further comprises:
a second ebullated bed reactor; and
a second separator;
the second mode further comprises:
reacting a resid hydrocarbon in the second ebullated bed reactor containing a hydrocracking catalyst to form a third effluent;
separating the third effluent in the second separator into a third gas phase and a third liquid phase; and
fractionating the third liquid phase in the fractionation system to produce the at least one atmospheric distillate and the atmospheric bottoms.

3. The process of claim 1, further comprising transitioning the system between the second mode back to the first mode.

4. The process of claim 1, wherein transitioning further comprises lowering the temperature of the first ebullated bed reactor.

5. The process of claim 2, further comprising
cooling the first gas phase and the second gas phase to recover a hydrogen-containing gas fraction and a distillate fraction; and
feeding the distillate fraction to the first liquid phase product and the second reactor effluent.

6. The process of claim 5, further comprising recycling at least a portion of the recovered hydrogen to the first ebullated bed reactor.

7. The process of claim 5, further comprising recycling at least a portion of the recovered hydrogen to the second ebullated bed reactor.

8. The process of claim 2, further comprising cooling the second bottoms fraction via direct heat exchange with at least one of a portion of the resid or a portion of the first bottoms fraction.

9. A process for upgrading resid in a system comprising:
a first ebullated bed reactor;
a first separator;
a stripping tower;
a fractionation system;
a solvent deasphalting system;
a second ebullated bed reactor; and
a second separator;
the process comprising:
operating the system in a first mode to produce a feed for a residual fluid catalytic cracking (RFCC) unit, the first mode comprising:
reacting a deasphalted oil and a vacuum distillate in the first ebullated bed reactor containing a hydrotreating catalyst to form a first effluent;
separating the first effluent in the first separator into a first gas phase and a first liquid phase;
stripping the first liquid phase in the stripping tower to produce a strippers bottom and a stripper overhead;
fractionating the stripper overhead in the fractionation system to produce at least one atmospheric distillate and an atmospheric bottoms;
fractionating the atmospheric bottoms in the fractionation system to produce the vacuum distillate and a vacuum bottoms;
solvent deasphalting the vacuum bottoms in the solvent deasphalting system to produce the deasphalted oil; and
transporting the strippers bottoms as the feed to the RFCC unit;
wherein the first mode is operated with a first particle size distribution providing low pressure drop under a range of bed expansions from 5% to 25%;
operating the system in a second mode to maximize the resid conversion in the first ebullated bed reactor, the second mode comprising:
reacting the deasphalted oil in the first ebullated bed reactor containing a hydrocracking catalyst to form a second effluent;
separating the second effluent in the first separator into a second gas phase and a second liquid phase;
fractionating the second liquid phase in the fractionation system to produce at least one atmospheric distillate and an atmospheric bottoms;
fractionating the atmospheric bottoms in the fractionation system to produce the vacuum distillate and the vacuum bottoms; and
solvent deasphalting the vacuum bottoms to produce the deasphalted oil;
reacting a resid hydrocarbon in the second ebullated bed reactor containing a hydrocracking catalyst to form a third effluent;
separating the third effluent in the second separator into a third gas phase and a third liquid phase; and
fractionating the third liquid phase in the fractionation system to produce the at least one atmospheric distillate and the atmospheric bottoms
wherein the second mode is operated with a second particle size distribution providing low pressure drop under a range of bed expansions from 40% to 60%;
transitioning the system between the first mode and the second mode, wherein the transitioning comprises:
removing the hydrotreating catalyst from the first ebullated bed reactor while simultaneously adding a hydrocracking catalyst to the first ebullated bed reactor and increasing a speed of an ebullating pump;

fractionating the first liquid phase in the fractionation system to produce the at least one atmospheric distillate and the atmospheric bottoms.

10. The process of claim 9, further comprising transitioning the system between the second mode back to the first mode.

11. The process of claim 9, wherein transitioning further comprises lowering the temperature of the first ebullated bed reactor.

12. The process of claim 9, further comprising cooling the first gas phase and the second gas phase to recover a hydrogen-containing gas fraction and a distillate fraction; and feeding the distillate fraction to the first liquid phase product and the second reactor effluent.

13. The process of claim 12, further comprising recycling at least a portion of the recovered hydrogen to the first ebullated bed reactor.

14. The process of claim 12, further comprising recycling at least a portion of the recovered hydrogen to at least one of the second ebullated bed reactor.

15. The process of claim 9, further comprising cooling the second bottoms fraction via direct heat exchange with at least one of a portion of the resid and a portion of the first bottoms fraction.

\* \* \* \* \*